Figure 2:
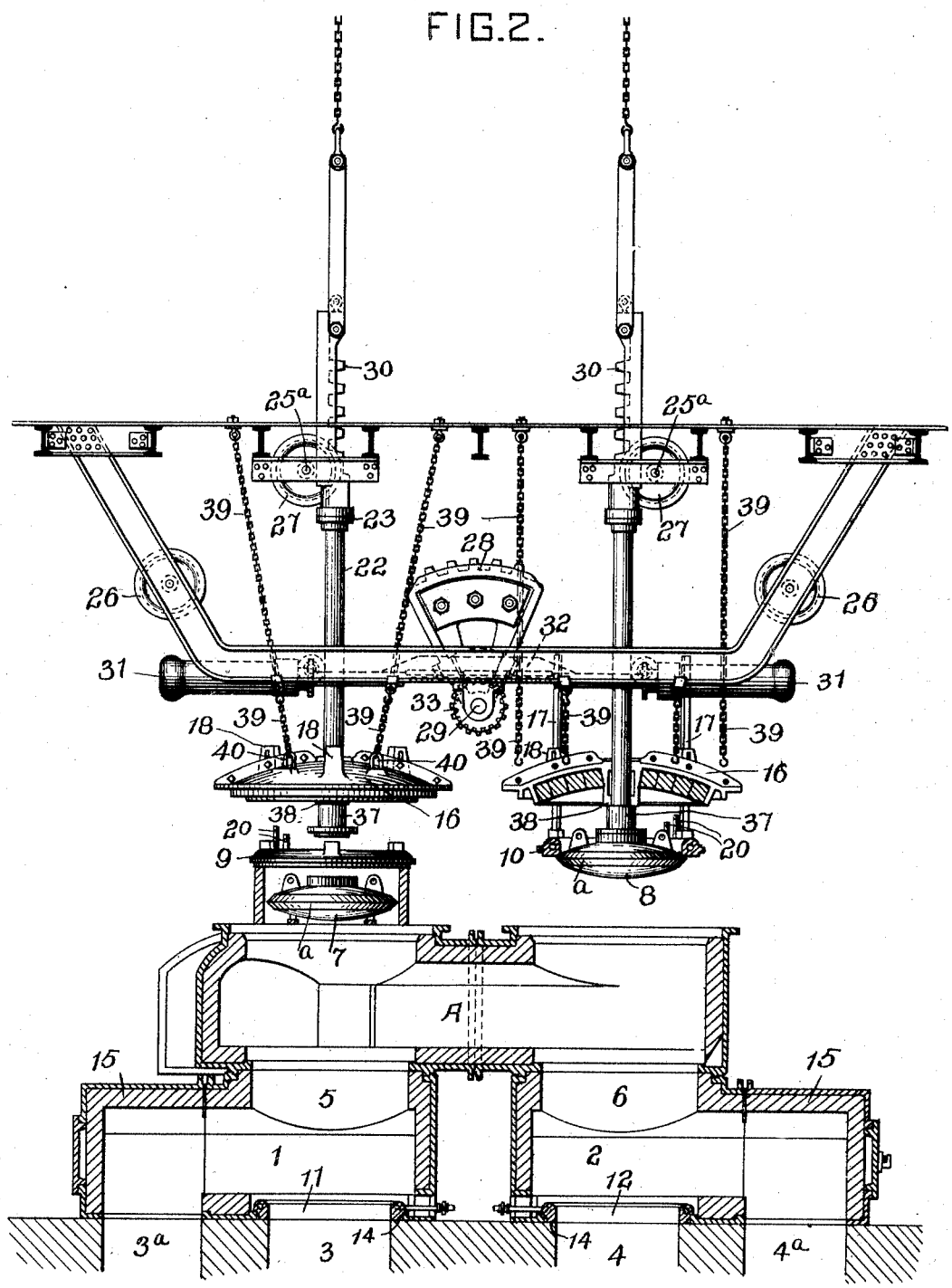

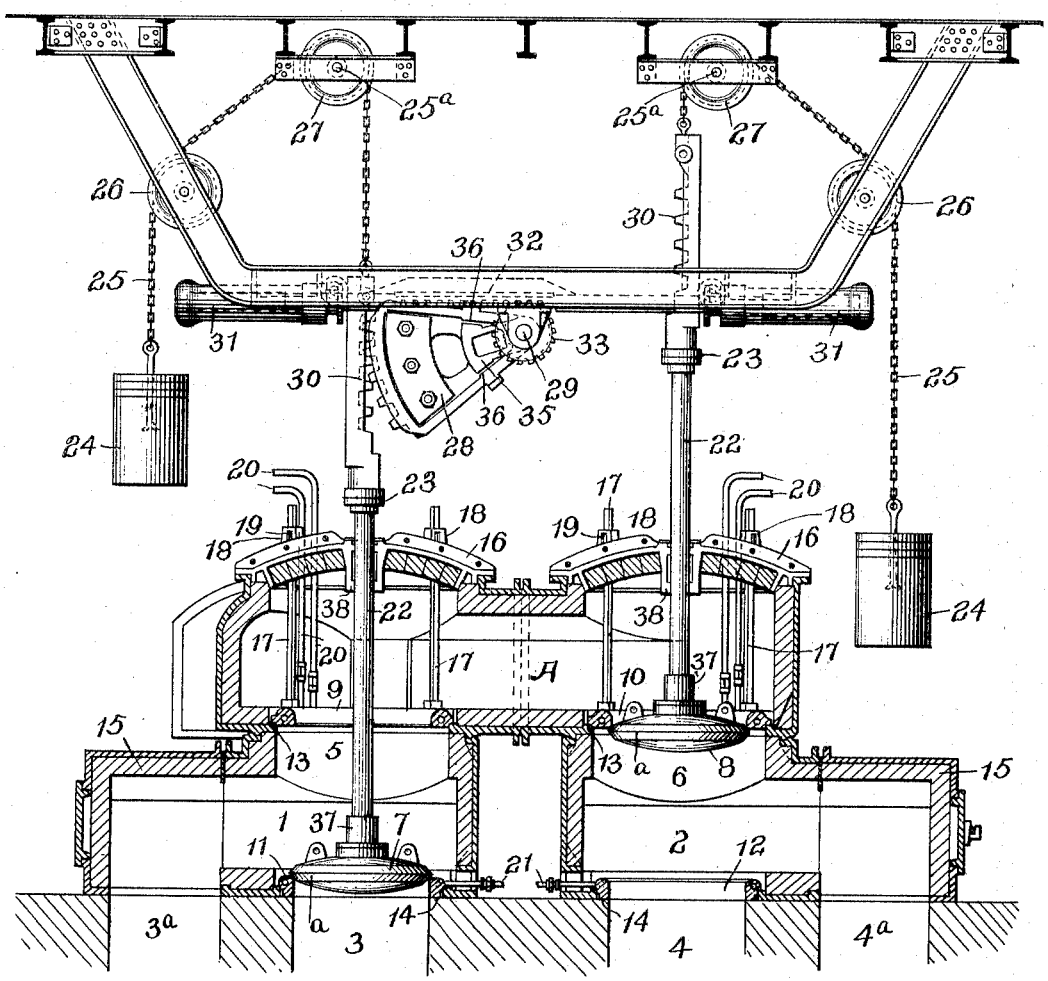
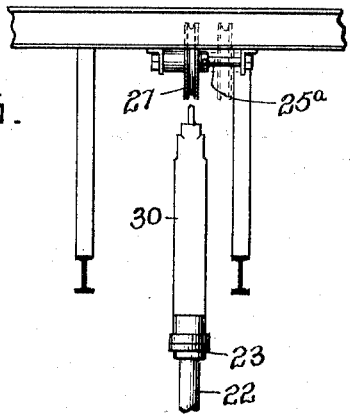

No. 777,509. PATENTED DEC. 13, 1904.
S. V. HUBER.
VALVE MECHANISM FOR FURNACES.
APPLICATION FILED MAY 5, 1904.
NO MODEL. 3 SHEETS—SHEET 2.

WITNESSES:
Herbert Bradley
Fred Kirchner

INVENTOR
Sigmund V. Huber,
by Christy & Christy, Atty's

No. 777,509. PATENTED DEC. 13, 1904.
S. V. HUBER.
VALVE MECHANISM FOR FURNACES.
APPLICATION FILED MAY 5, 1904.
NO MODEL. 3 SHEETS—SHEET 3.
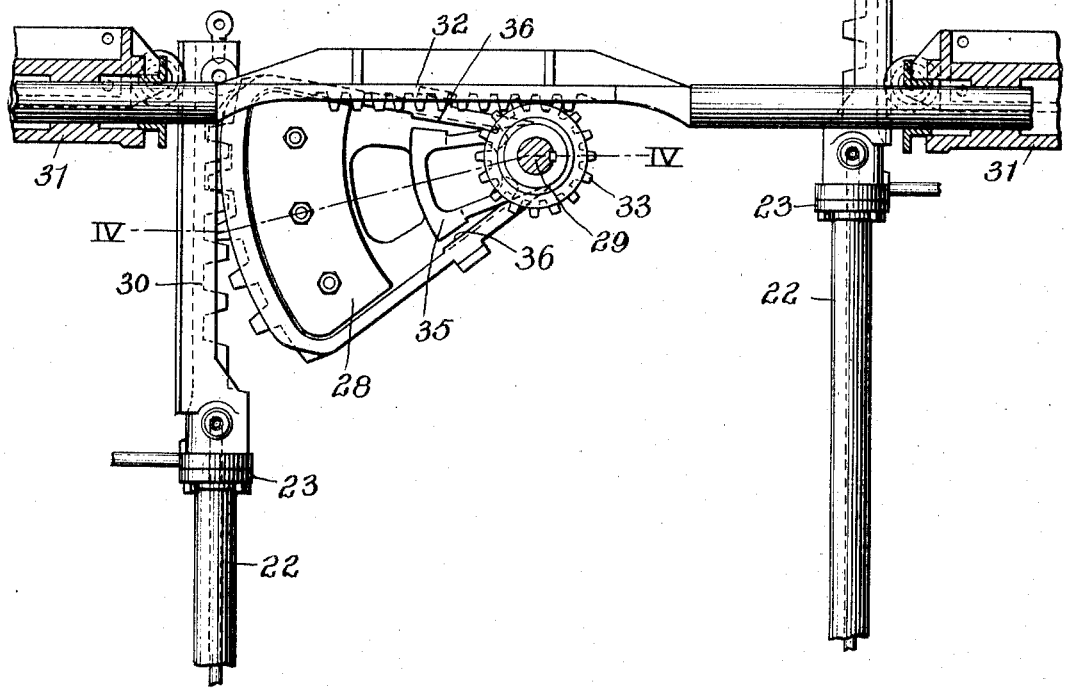
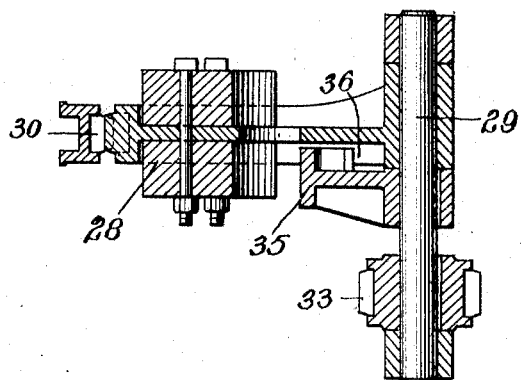
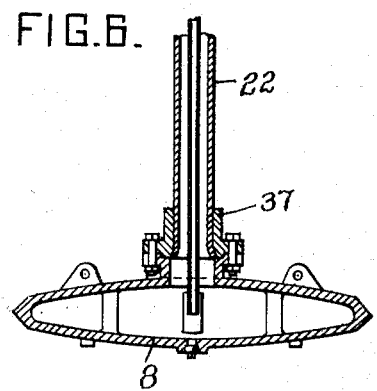
WITNESSES:
Herbert Bradley.
Fred Kirchner.
INVENTOR
Sigmund V. Huber,
by Christy & Christy, Atty's No. 777,509. Patented December 13, 1904.

UNITED STATES PATENT OFFICE.

SIGMUND V. HUBER, OF PITTSBURG, PENNSYLVANIA.

VALVE MECHANISM FOR FURNACES.

SPECIFICATION forming part of Letters Patent No. 777,509, dated December 13, 1904.

Application filed May 5, 1904. Serial No. 206,570. (No model.)

*To all whom it may concern:*

Be it known that I, SIGMUND V. HUBER, a citizen of the United States, residing at Pittsburg, in the county of Allegheny and State of Pennsylvania, have invented or discovered certain new and useful Improvements in Valve Mechanism for Furnaces, of which improvements the following is a specification.

The invention described herein relates to certain improvements in valves for furnaces and mechanism for operating the same.

The invention has for its object a construction of valve and operating mechanism wherein the valve will be shifted automatically in one direction, while its movement in the opposite direction is effected by the application of an overbalancing weight.

It is a further object of the invention to provide for the shifting of the operating-weight from one operating mechanism to another.

The invention has for its object a construction whereby the valves and their seats may be easily removed and new valves and seats placed in position.

The invention is hereinafter more fully described and claimed.

In the accompanying drawings, forming a part of this specification, Figure 1 is an elevation, partly in section, of gas or air flues for furnaces, illustrating the construction and arrangements of valves, valve-seats, and valve-operating mechanism. Fig. 2 is a similar view illustrating a renewal of the valves or valve-seats, or both. Fig. 3 is a detail view, on an enlarged scale, of the weight-shifting mechanism. Fig. 4 is a sectional view on a plane indicated by the line IV IV, Fig. 3. Fig. 5 is a detail view illustrating the shifting guide-pulley, and Fig. 6 is a sectional view of one of the valves.

In the practice of my invention the valve-chambers 1 and 2 are connected by ports with flues 3 3ª and 4 4ª, the flues 3 and 4 leading to the heating-chamber of the furnace and the ports 3ª and 4ª to the stack. These chambers 1 and 2 are also connected by ports 5 and 6 with a chamber A, which is in communication with the air or a suitable gas-supply. The flow of gas or air through the ports 5 and 6 to the chambers 1 and 2, and from these chambers to and through the flues 3 and 4, is controlled by valves 7 and 8, which are made in the form of disks, and with water chambers or passages to prevent injurious heating. These valves have inclined peripheral bearing portions *a* on opposite sides to form tight joints, with renewable annular seats 9 10 11 12 arranged, respectively, in the ports 5 and 6 and the entrance to the flues 3 and 4. As will be seen in Fig. 1, the port 5 and the entrance to flue 3 are in line with each other and the port 4 in line with the entrance to flue 4, so that by the movement of the valves in one direction they seat on the rings 9 and 11 and when moved in the opposite direction they will seat on the rings 10 and 12. The ports 5 and 6 are provided with ledges 13 to support the annular or ring seats 9 and 10, and similar ledges 14 are provided at the entrance to flues 3 and 4 for the seats 11 and 12.

As will be seen by reference to Figs. 1 and 2, the valve-chambers 1 and 2 are provided with removable wall-sections 15, so as to permit of the removal of the annular seats 11 and 12. The top of the chamber A is provided with openings having removable covers 16, said openings being in the line of movement of the valves 7 and 8 and sufficiently large to permit of the withdrawal of the valves and the valve-seats 9 and 10, as hereinafter described. As in closing the ports 5 and 6 the valves 7 and 8 would tend to lift the seats 9 and 10, holding-rods are passed down through lugs 18 on the covers 16, so as to bear against the seats, the rods being locked to the covers in any suitable manner, as by keys 19 passing through the lugs 18 and the rods 17. Water is supplied to the rings 9 and 10 by pipes 20, extending down through the covers 16, and to the rings 11 and 12 by pipes 21. The valves 7 and 8 are supplied with water through their hollow stems 22, the supply and exit ports for the water being formed in the heads 23 on the stems.

In order to operate—*i. e.*, raise and lower the valves 7 and 8, and so that they will be held yieldingly against their seats—independent lifting and lowering devices are employed. The lifting devices consist of weights 24, connected to the upper ends of the stem by means of chains 25, which pass over guide-pulleys 26 and 27. The weights 24 are made a little heavier than the valves with their stems, so that when the valves are free to move, as hereinafter described, the weights will draw them up against their rings or seats 9 and 10. The downward movement of the valves is effected by means of a shiftable weight 28, which is adapted to be placed in operative relation with one or the other of the valve-stems, as the movement of such valve is required. A desirable construction of weight-shifting mechanism consists in making the weight in the form of a segmental block, which is loosely mounted upon a shaft 29 and is provided with suitable means for engagement alternately with the valve-stems. A desirable means for connecting the weight with the valve-stems consists in forming teeth on the periphery of the weight, said teeth being adapted to engage with rack-bars 30, secured to the heads 23 on the valve-stems. In order to shift the weight from engagement with one rack-bar into engagement with the other, fluid-pressure cylinders 31 are preferably employed, the pistons of said cylinders being connected to a rack-bar 32, adapted to engage a pinion 33 on the shaft 29. As shown in Figs. 1, 3, and 4, the weight 28 is shifted through the medium of an arm 35 on the shaft 29 and projecting between shoulders or stops 36 on the weight. If it be desired to shift the valve from the position shown in Fig. 1, fluid-pressure is admitted into one or the other of the fluid-pressure cylinders, thereby lifting the weight 28, so that the weight 24 of the valve will become operative to raise the same. By a further movement of the weight 28 it is caused to engage the rack-bar on the other valve, 8, and force the valve down, raising the weight 24. It will be understood that the fluid-pressure cylinders are not employed for shifting the valves, but simply for shifting the weight from engagement with one valve-stem or its rack-bar into engagement with the other valve-stem or its rack-bar.

When it is desired to change the valve or its seat, the weight 24 is detached from its chain and a suitable lifting device, as a block and tackle, is connected to the rack-bar or valve-stem, and the valve, with its seat and cover, is raised to the position shown in Fig. 2. As in its upward movement the rack-bar would strike against the upper guide-pulley 27, the latter is mounted adjustably upon its shaft $25^a$, so that it may be shifted to one side of the line of movement of the rack-bar when the valve is to be changed, as shown in Fig. 5. Prior to the lifting of the valve the keys 19 are knocked out, so that during the upward movement of the seat and valve the rods 17 will slide through the cover until the shoulder 37 on the valve-stem bears against boss 38 on the cover, so that during the further movement of the valve-stem the cover will be raised. After the valve, ring, and cover have been raised to a suitable height independent props are placed under the ring and valve and the stem lowered until said parts rest upon their props or supports. The stem is then detached from the valve and drawn up, so as to permit the removal of the ring or valve or both parts and new parts substituted therefor. Suitable supports are provided for the cover, said supports being preferably formed by chains 39, depending from the frame of the building or the framing of the valve-operating mechanism and provided with hooks for engagement with eyes 40 on the cover.

By reason of the play allowed the arm 35 between the stops 36 the fluid-pressure mechanism will operate only as a weight-shifter, in one case gradually relieving one valve from the action of the weight and in the other case the weight to act with increasing efficiency on the other valve.

I claim herein as my invention—

1. In a furnace the combination of two ports, a valve controlling both ports, automatic means for shifting the valve into position to close one of said ports and a removable weight for shifting the valve to close the other port, substantially as set forth.

2. In a furnace the combination of two ports, a valve controlling both ports and having a normal bias in a direction to close one of said ports and a weight for shifting the valve in the opposite direction, and means for shifting said weight into and out of engagement with such valve, substantially as set forth.

3. In a furnace the combination of two pairs of ports, a valve controlling each pair of ports, automatic means for shifting said valves into position to close one port of each pair, and a weight for shifting the valves in the opposite direction, and means for transferring said weight from engagement with one valve to engagement with the other valve, substantially as set forth.

4. In a furnace the combination of a chamber, a port leading from said chamber, a removable cover for an opening in the chamber in line with said port, a removable valve-seat and a valve and means for raising the valve, valve-seat and cover, substantially as set forth.

5. In a furnace the combination of a chamber, a port leading from said chamber, a cover closing an opening in line with said port, an annular valve-seat or ring, and bars connected to the cover and bearing against the seat to hold the same in operative position, substantially as set forth.

In testimony whereof I have hereunto set my hand.

SIGMUND V. HUBER.

Witnesses:
F. E. GAITHER,
FRED KIRCHNER.